United States Patent
Wu (10) Patent No.: US 12,200,692 B2
(45) Date of Patent: Jan. 14, 2025

(54) TRANSMISSION METHOD AND TERMINAL DEVICE

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 419 days.

(21) Appl. No.: 17/736,709

(22) Filed: May 4, 2022

(65) Prior Publication Data

US 2022/0264609 A1    Aug. 18, 2022

Related U.S. Application Data

(63) Continuation of application No. PCT/CN2019/116882, filed on Nov. 8, 2019.

(51) Int. Cl.
| | |
|---|---|
| H04W 72/1268 | (2023.01) |
| H04L 1/08 | (2006.01) |
| H04L 1/1812 | (2023.01) |
| H04W 72/20 | (2023.01) |
| H04W 72/23 | (2023.01) |

(52) U.S. Cl.
CPC ........... *H04W 72/1268* (2013.01); *H04L 1/08* (2013.01); *H04L 1/1812* (2013.01); *H04W 72/20* (2023.01); *H04W 72/23* (2023.01)

(58) Field of Classification Search
CPC . H04W 72/1268; H04W 72/20; H04W 72/23; H04L 1/08; H04L 1/1812; H04L 5/0044; H04L 1/1896; H04L 1/1822; H04L 1/1887; H04L 1/1864; H04L 1/1893
See application file for complete search history.

(56) References Cited

U.S. PATENT DOCUMENTS

| | | |
|---|---|---|
| 2019/0075589 A1 | 3/2019 | Jeon et al. |
| 2019/0215136 A1 | 7/2019 | Zhou et al. |
| 2019/0230656 A1 | 7/2019 | Soriaga et al. |
| | (Continued) | |

FOREIGN PATENT DOCUMENTS

| | | |
|---|---|---|
| CN | 105580445 A | 5/2016 |
| CN | 108886447 A | 11/2018 |
| | (Continued) | |

OTHER PUBLICATIONS

Author Unknown, PUSCH enhancements for URLLC, pp. 1-13, Oct. 20 (Year: 2019).*

(Continued)

*Primary Examiner* — Christopher M Crutchfield
(74) *Attorney, Agent, or Firm* — Young Basile Hanlon & MacFarlane, P.C.

(57) ABSTRACT

A transmission method and a terminal device are provided in implementations of the present disclosure. The method includes the following. A terminal device determines a target uplink (UL) resource on a target carrier for transmitting a target UL channel. The terminal device transmits at least part of content in the target UL channel on at least part of the target UL resource according to a detection result of the target carrier.

20 Claims, 3 Drawing Sheets

(56) References Cited

U.S. PATENT DOCUMENTS

2021/0144743 A1* 5/2021 Rastegardoost ...... H04W 72/23
2022/0394751 A1* 12/2022 Myung .................... H04L 1/18

FOREIGN PATENT DOCUMENTS

| CN | 109479306 A | 3/2019 |
|---|---|---|
| WO | 2018169806 A1 | 9/2018 |

OTHER PUBLICATIONS

Author Unknown, On Configured Grant Resource for Duplication, pp. 1-3, Aug. 30 (Year: 2019).*
Author Unknown, PUSCH enhancements for NR URLLC, pp. 1-11, Oct. 20 (Year: 2019).*
International search report with English Translation issued in corresponding international application No. PCT/CN2019/116882 dated Jul. 29, 2020.
Extended European Search Report for EP Application 19951329.2 mailed Oct. 19, 2022. (7 pages).

* cited by examiner

TRANSMISSION METHOD AND TERMINAL DEVICE

CROSS-REFERENCE TO RELATED APPLICATION(S)

This application is a continuation of International Application No. PCT/CN2019/116882, filed on Nov. 8, 2019, the entire disclosure of which is incorporated herein by reference.

TECHNICAL FIELD

The present disclosure relates to the technical field of communication, and more particularly, to a transmission method and a terminal device.

BACKGROUND

A configured grant-physical uplink shared channel (CG-PUSCH) and a scheduled-physical uplink shared channel (S-PUSCH) in a new radio unlicensed (NR-U) system support multiple continuous physical uplink shared channel (PUSCH) transmissions. When a terminal device transmits on multiple continuous PUSCHs, repeated transmissions may be performed on the multiple continuous PUSCHs. In related arts, when the terminal device transmits on an uplink (UL) channel, repeated transmissions are usually statically configured for multiple continuous PUSCHs, which results in poor flexibility in channel transmission.

SUMMARY

In a first aspect of implementations of the present disclosure, a transmission method is provided. The method includes the following. A terminal device determines a target uplink (UL) resource on a target carrier for transmitting a target UL channel. The terminal device transmits at least part of content in the target UL channel on at least part of the target UL resource according to a detection result of the target carrier.

In a second aspect of implementations of the present disclosure, a transmission method is provided. The method includes the following. A network device determines a target UL resource on a target carrier for transmitting a target UL channel. The network device receives at least part of content in the target UL channel on at least part of the target UL resource.

In a third aspect of implementations of the present disclosure, a terminal device is provided. The device includes a processor, a transceiver, and a memory configured to store one or more programs. The processor is configured to invoke and execute the one or more programs stored in the memory to: determine a target UL resource on a target carrier for transmitting a target UL channel, and cause the transceiver to transmit at least part of content in the target UL channel on at least part of the target UL resource according to a detection result of the target carrier.

BRIEF DESCRIPTION OF DRAWINGS

In order to more clearly illustrate technical solutions in implementations of the present disclosure, the following will briefly introduce drawings required for description of implementations. Obviously, the drawings in the following description illustrate some implementations of the present disclosure. For those of ordinary skill in the art, other drawings can be obtained from these drawings without creative work.

DETAILED DESCRIPTION

The terms used in implementation part of the present disclosure are only used to illustrate specific implementations of the present disclosure, but not intended to limit the present disclosure. The terms "first", "second", "third", and "fourth" in the specification, claims, and drawings of the present disclosure are used to distinguish different objects, but not to describe a specific order. In addition, the terms "including", "comprising", "having", and any variations thereof are intended to cover non-exclusive inclusions.

Implementations of the present disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a wireless local area network (WLAN), a wireless fidelity (WiFi), a next-generation communication system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Implementations herein can also be applied to these communication systems.

Optionally, a communication system of implementations may be applied to a carrier aggregation (CA) scenario, a dual connectivity (DC) scenario, or a standalone (SA) network deployment scenario.

A spectrum applied is not limited in implementations of the present disclosure. For example, implementations of the present disclosure may be applicable to a licensed spectrum, and may also be applicable to an unlicensed spectrum.

Figure 1:
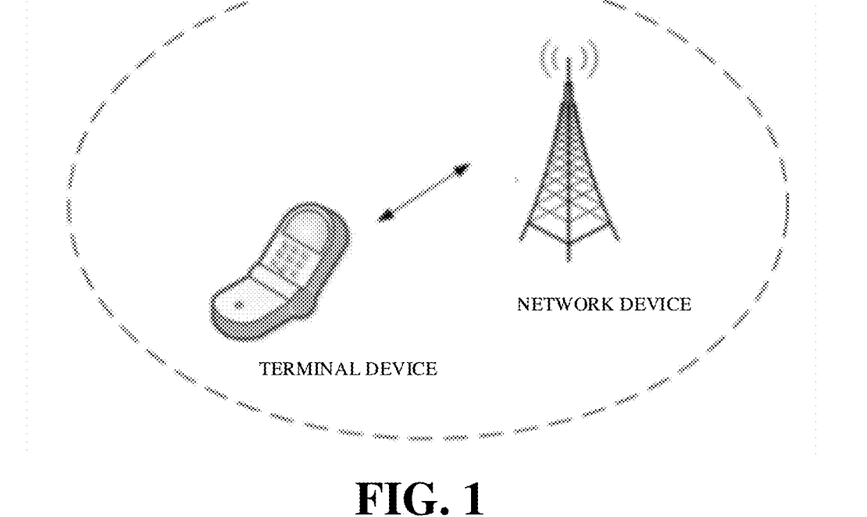
FIG. 1 is a schematic diagram of an architecture of a communication system provided in implementations of the present disclosure.

Referring to FIG. 1, FIG. 1 is a schematic diagram of an architecture of a communication system provided in implementations of the present disclosure. The communication system includes a network device and a terminal device. As illustrated in FIG. 1, the network device can communicate with the terminal device. The communication system may be a 5th generation (5G) communication system, such as a new radio (NR) system, a communication system that integrates multiple communication technologies, such as a communication system that integrates LTE technologies and NR technologies, or a future evolved communication system. The form and the number of the network device and the terminal device illustrated in FIG. 1 are only for example, and do not constitute a limitation to implementations of the present disclosure.

The terminal device in the present disclosure is a device with a wireless communication function. The terminal device may be deployed on land, for example, deployed indoors or outdoors, and may be handheld, wearable, or vehicle-mounted. The UE may also be deployed on water, for example, on a ship, etc. The terminal device may also be deployed in the air, for example, on an airplane, an air balloon, a satellite, etc. The UE may be a mobile phone, a pad, a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in smart home, etc. The terminal device may also be a handheld device, a vehicle-mounted device, a wearable device, or a computer device with a wireless communication function, or another processing device connected to a wireless modem. In different networks, the terminal device may have different names, such as, terminal device, access terminal, user unit, user station, mobile station, remote station, remote terminal, mobile device, user terminal, terminal, wireless communication device, user agent, or user device, cellular phone, cordless phone, session initiation protocol (SIP) phone, wireless local loop (WLL) station, personal digital assistant (PDA), terminal device in a 5G network or a future evolved network, etc.

The network device in the present disclosure is a device deployed in a wireless access network to provide a wireless communication function. For example, the network device may be a radio access network (RAN) device on access network side in a cellular network. The so-called RAN device is a device configured to connect the terminal device to a wireless network, and includes but is not limited to: an evolved node B (eNB), a radio network controller (RNC), a node B (NB), a base station controller (BSC), a base transceiver station (BTS), a home base station, for example, a home evolved node B or a home node B (HNB), a base band unit (BBU), or a mobility management entity (MME). For another example, the network device may also be a node device in a wireless local area network (WLAN), such as an access controller (AC), a gateway, or a wireless fidelity (Wi-Fi) access point (AP). For another example, the network device may also be a transmission node or a transmission reception point (TRP or TP) in an NR system.

An unlicensed spectrum is allocated by a country and region and available for communication of radio devices. The spectrum is generally considered as a shared spectrum. That is, communication devices in different communication systems may utilize the spectrum without applying to the government for dedicated spectrum grants, as long as the regulatory requirements made by the country or region for the spectrum are met.

To enable various communication systems, which perform wireless communication by utilizing an unlicensed spectrum, to coexist on the unlicensed spectrum friendly, some countries or regions have made regulatory requirements that need to be satisfied during use of the unlicensed spectrum. For example, a communication device follows a listen before talk (LBT) rule. That is, the communication device needs to firstly perform channel listening, before transmitting a signal on a channel in an unlicensed spectrum, and the communication device can transmit a signal only if a channel listening result indicates that the channel is idle. If the channel listening result of the communication device for the channel in the unlicensed spectrum indicates that the channel is busy, the communication device may not transmit a signal. Moreover, to ensure fairness, during each time of transmission, a duration in which the communication device performs signal transmission using the channel in the unlicensed spectrum may not exceed a maximum channel occupancy time (MCOT).

In the NR system, a configured grant (CG) resource can be configured semi-statically through higher layer signaling. There are two specific implementation schemes.

Type 1: an actual uplink (UL) grant can be obtained through radio resource control (RRC) signaling.

Type 2: an actual UL grant can be obtained through a configured scheduling-radio network temporary identifier (CS-RNTI) scrambled physical downlink control channel (PDCCH).

In the NR system, physical uplink shared channel (PUSCH) mapping includes PUSCH mapping Type A and PUSCH mapping Type B. In the above two modes, a reference position l of a symbol and a position l0 of a first demodulation reference signal (DMRS) symbol are different.

For PUSCH mapping Type A, in the absence of hopping in frequency domain, l is defined relative to a start of a time slot, and in the existence of hopping in frequency domain, l is defined relative to a start after each frequency hopping. l0 is configured through higher layer signaling and takes a value of symbol 2 or symbol 3.

For PUSCH mapping Type B, in the absence of hopping in frequency domain, l is defined relative to a start of a scheduled-PUSCH (S-PUSCH) resource, and in the existence of hopping in frequency domain, l is defined relative to a start after each frequency hopping. l=0.

Value ranges of a start symbol S and a length L of a PUSCH for PUSCH mapping Type A and Type B are illustrated in Table 1 below. As can be seen from Table 1, Type A always starts from 0, a length of a S-PUSCH ranges from 4 to 14 symbols, Type B may start from any symbol in a time slot, and the S-PUSCH can be of any length.

TABLE 1

| PUSCH mapping type | normal cyclic prefix | | | extended cyclic prefix | | |
|---|---|---|---|---|---|---|
| | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 11} | {1, ..., 12} | {1, ..., 12} |

In implementations of the present disclosure, a target UL channel includes at least a first UL channel and a second UL channel, and a target UL resource includes at least a first UL resource and a second UL resource.

Figure 2:
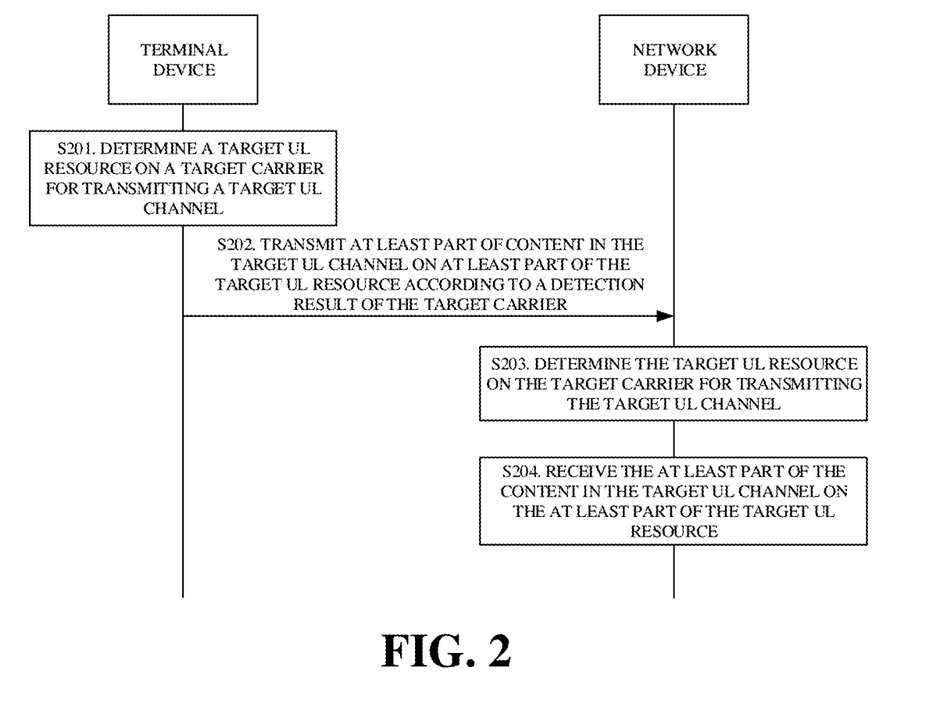
FIG. 2 is a schematic interaction diagram of a transmission method provided in implementations of the present disclosure.

Referring to FIG. 2, FIG. 2 is a schematic interaction diagram of a transmission method provided in implementations of the present disclosure. As illustrated in FIG. 2, the transmission method includes S201-S204, as follows.

At S201, a terminal device determines a target UL resource on a target carrier for transmitting a target UL channel.

The terminal device may determine the target UL resource on the target carrier for transmitting the target UL channel according to configuration information or other information. The configuration information can be configured by a network device or other devices.

At S202, the terminal device transmits at least part of content in the target UL channel on at least part of the target UL resource according to a detection result of the target carrier.

The at least part of the target UL resource may be the first UL resource or the second UL resource, or may be the first UL resource and the second UL resource. The at least part of the content in the target UL channel may include the first UL channel or the second UL channel, or the first UL channel and the second UL channel, etc.

Optionally, the first UL resource and the second UL resource are continuous in time domain, and the second UL resource is later than the first UL resource in time domain.

Optionally, the terminal device performs channel transmission on a target resource corresponding to a channel where a successful channel detection is obtained.

At S203, a network device determines the target UL resource on the target carrier for transmitting the target UL channel.

At S204, the network device receives the at least part of the content in the target UL channel on the at least part of the target UL resource.

An order of execution of S203, 5201, and S202 is not limited herein. S203 can be executed before S201 and S202, after S201 and S202, or simultaneously with S201 and S202.

The terminal device determines a target UL resource on a target carrier for transmitting a target UL channel, and transmits at least part of content in the target UL channel on at least part of the target UL resource according to a detection result of the target carrier. As such, compared with related arts where transmission is usually performed through static configuration, after the target UL resource is obtained, channel transmission can be performed according to the detection result of the target carrier, thereby improving flexibility in channel transmission.

In a possible implementation, the terminal device may receive first indication information, where the first indication information indicates whether the first UL resource and the second UL resource are used for a repeated transmission.

The first indication information may be information indicated directly or indirectly.

The first indication information may be transmitted by the network device to the terminal device and includes at least one of: indication information indicating whether the target UL resource is used for a repeated transmission, and indication information indicating a number of repeated transmissions on the target UL resource.

Optionally, the indication information indicating the number of retransmissions on the target UL resource may specifically indicate a repeated transmission when the number of retransmissions is greater than 1, or indicate an independent transmission when the number of retransmissions is equal to 1.

In this example, whether the target UL resource is used for a repeated transmission is indicated through the first indication information. As such, the network device can inform the terminal device whether multiple continuous UL transmissions are independent transmissions or repeated transmissions. If the multiple UL transmissions are repeated transmissions and correspond to different resource sizes, there is a consistent understanding of a transport block size (TBS) of transport blocks of the repeated transmissions, thereby avoiding degradation of demodulation performance of UL transmission due to a rate matching error.

In a possible implementation, the first indication information may be transmitted through at least one of: downlink control information (DCI), RRC signaling, and a media access control-control element (MAC CE).

In a possible implementation, the target UL resource includes a configured grant-physical uplink shared channel (CG-PUSCH) UL resource. The first indication information is configured in RRC signaling of a parameter of a configured grant configuration, or the first indication information is configured in RRC signaling for activating the configured grant configuration, or the first indication information is contained in an activating DCI for the configured grant configuration.

In this example, the target UL resource includes the CG-PUSCH UL resource, and the first indication information is configured in the RRC signaling of the parameter of the configured grant configuration, the RRC signaling for activating the configured grant configuration, or contained in the activating DCI for the configured grant configuration, thereby improving security of the first indication information.

In a possible implementation, the target UL resource includes a S-PUSCH UL resource, and the first indication information is configured in RRC signaling of a PUSCH configuration parameter or is transmitted through DCI for scheduling a transmission of the target UL resource.

In this example, the target UL resource includes the S-PUSCH UL resource, and the first indication information is configured in the RRC signaling of the PUSCH configuration parameter or is contained in the DCI for scheduling the transmission of the target UL resource, thereby improving security of the first indication information.

In a possible implementation, the terminal device transmits second indication information to a network device, where the second indication information indicates whether the first UL resource and the second UL resource are used for a repeated transmission.

The second indication information includes at least one of: indication information of whether the target UL resource is used for a repeated transmission, indication information of a number of repeated transmissions on the target UL resource, a hybrid automatic repeat-request (HARQ) process number corresponding to the first UL resource, a new data indicator (NDI) corresponding to the first UL resource, an HARQ process number corresponding to the second UL resource, and an NDI corresponding to the second UL resource.

In this example, the terminal device can indicate whether the first UL resource and the second UL resource are used for a repeated transmission by transmitting the second indication information to the network device. If the first UL resource and the second UL resource are used for a repeated transmission and multiple UL transmissions correspond to different resource sizes, there is a consistent understanding of a TBS of transport blocks of the repeated transmissions, thereby avoiding degradation of demodulation performance of UL transmission due to a rate matching error.

In a possible implementation, the second indication information may be transmitted through at least one of: uplink control information (UCI) and an UL DMRS. Specifically, the second indication information may be transmitted through the UCI, the DMRS, or the UCI and the UL DMRS.

In a possible implementation, the target UL resource includes a CG-PUSCH UL resource, and the second indication information is transmitted through UCI or is contained in an UL DMRS, where the UCI indicates to demodulate a CG-PUSCH.

In this example, when the target UL resource includes the CG-PUSCH UL resource, the second indication information is transmitted through the UCI or is contained in the UL DMRS, thereby improving security in transmitting the second indication information.

In a possible implementation, the target UL resource includes a S-PUSCH UL resource, and the second indication information is contained in an UL DMRS.

In this example, when the target UL resource includes the S-PUSCH UL resource, the second indication information is contained in the UL DMRS for transmission, thereby improving security in transmitting the second indication information.

In a possible implementation, the first UL resource and the second UL resource are used for a repeated transmission, and an HARQ process number corresponding to the first UL resource is the same as an HARQ process number corresponding to the second UL resource, or the first UL resource and the second UL resource are used for a repeated transmission, the HARQ process number corresponding to the first UL resource is the same as the HARQ process number corresponding to the second UL resource, and an NDI corresponding to the first UL resource is the same as an NDI corresponding to the second UL resource.

In a possible implementation, the first UL resource and the second UL resource are used for a repeated transmission, and a TBS of a transmission of the first UL resource and the second UL resource is determined based on a number of reference resources.

The TBS of the transmission of the first UL resource and the second UL resource may be specifically determined based on the number of reference resources as follows.

The number of reference resources is determined according to a first one in the target UL resource, the number of reference resources is determined according to a last one in the target UL resource, the number of reference resources is determined according to a UL resource with the least resources in the target UL resource, the number of reference resources is determined according to a UL resource with the most resources in the target UL resource, the number of reference resources is determined according to the first UL resource or the second UL resource, or the number of reference resources is an average number of resources of all UL resources in the target UL resource.

In a possible example, the target UL resource includes at least two UL resources, the at least two UL resources include at least two UL resources with different numbers of symbols, and the at least two UL resources are for repeated transmissions, then the at least two UL resources are used to transmit a same transport block, and a TBS of the transport block may be determined according to one UL resource among the at least two UL resources. The one UL resource is determined by at least one of the following methods.

A third UL resource may be a first one of the at least two UL resources. The third UL resource may be a last one of the at least two UL resources. The third UL resource may be one of UL resources with the least number of symbols among the at least two UL resources. The third UL resource may be one of UL resources with the largest number of symbols among the at least two UL resources. The third UL resource may be one of UL resources which include a same number of symbols among the at least two UL resources, and the number of the UL resources is greater than the number of any other UL resources which also include a same number of symbols.

The third UL resource is an UL resource among the at least two UL resources.

In a possible implementation, the terminal device transmits at least part of content in the target UL channel on at least part of the target UL resource according to the detection result of the target carrier as follows. The terminal device transmits the first UL channel on the first UL resource and transmits the second UL channel on the second UL resource, if detection of the terminal device is successful prior to the first UL resource. Alternatively, the terminal device transmits the second UL channel on the second UL resource if the detection of the terminal device fails prior to the first UL resource and is successful prior to the second UL resource.

Before performing target channel transmission, the terminal device detects the target UL resource to obtain the detection result. The detection result includes UL resource detection success and UL resource detection failure. When detection on the UL resource is successful, the UL resource can be used for channel transmission, and when the detection fails, the UL resource cannot be used for channel transmission.

In a possible implementation, the first UL resource and the second UL resource are used for a repeated transmission and belong to a first pre-configured resource configured through first configured grant information, where the first pre-configured resource is used for a repeated transmission, or the first UL resource and the second UL resource include a same number of symbols in time domain, or the first UL resource and the second UL resource include a same number of physical resource blocks (PRB) or a same number of combs in frequency domain.

In a possible implementation, the first UL resource and the second UL resource are used for an independent transmission, and an HARQ process number corresponding to the first UL resource is different from an HARQ process number corresponding to the second UL resource. Alternatively, the first UL resource and the second UL resource are used for an independent transmission, the HARQ process number corresponding to the first UL resource is different from the HARQ process number corresponding to the second UL resource, or an NDI corresponding to the first UL resource is different from an NDI corresponding to the second UL resource.

A possible example where the HARQ process number corresponding to the first UL resource is different from the HARQ process number corresponding to the second UL resource may be as follows.

(1) If a first UL channel corresponds to an HARQ process number #i, a second UL channel corresponds to an HARQ process number #mod(i+1, M), where M is the largest HARQ process number.

(2) An HARQ process number set {HARQ-IDa, HARQ-IDb, HARQ-IDc, HARQ-IDd, . . . } is configured by an upper layer. Assuming that an HARQ process number indicated in an UL scheduling grant is HARQ-IDb, then the first UL channel corresponds to HARQ-IDb, and the second UL channel corresponds to HARQ-IDc, which can be understood as an HARQ process number of a next position.

The above is only an example, not a specific limitation.

In a possible implementation, the first UL resource and the second UL resource are used for an independent transmission and belong to a second pre-configured resource configured through second configured grant information, where the second pre-configured resource is used for an independent transmission, or the first UL resource and the second UL resource include different numbers of symbols in time domain, or the first UL resource and the second UL resource include different numbers of PRBs and/or different numbers of combs in frequency domain.

Figure 3:
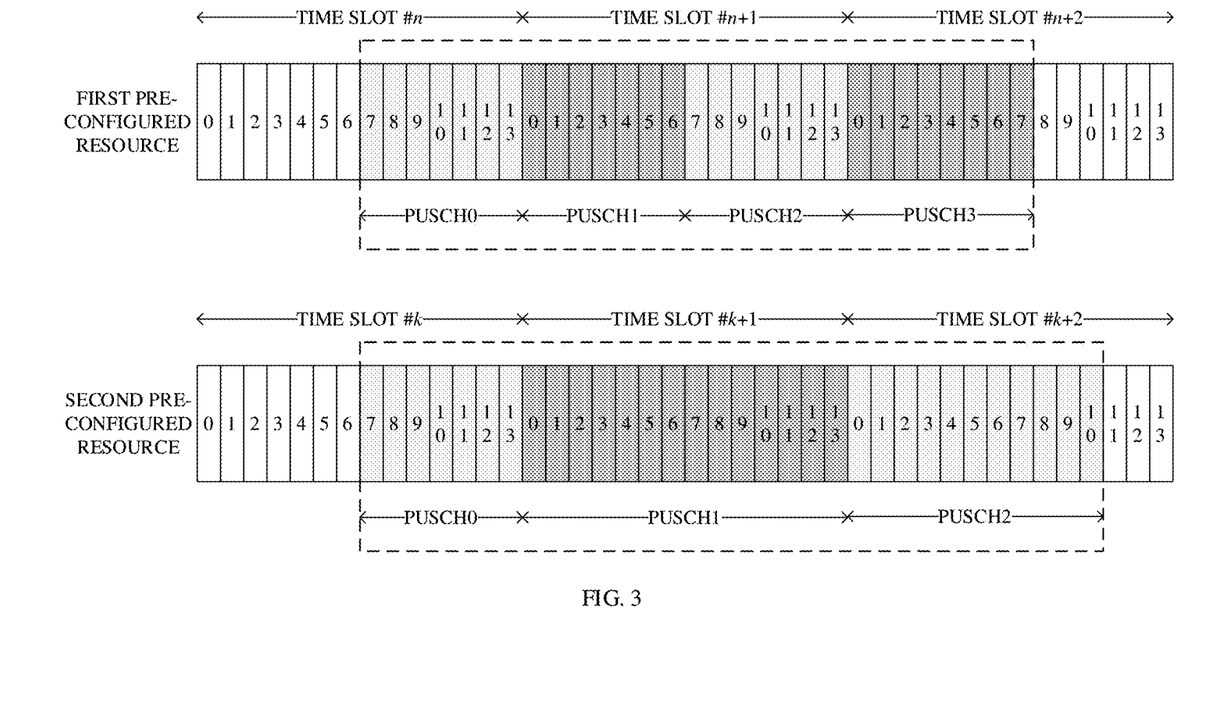
FIG. 3 is a schematic diagram of a resource configuration provided in implementations of the present disclosure.

Referring to FIG. 3, FIG. 3 is a schematic diagram of a resource configuration provided in implementations of the present disclosure. As illustrated in FIG. 3, each pre-configured resource is independently configured for a repeated transmission or an independent transmission. For example, the network device configures two CG resources for the terminal device. A resource size of each PUSCH in a first CG resource (i.e., the first pre-configured resource) is the same, so the first pre-configured resource may be configured by the network device for a repeated transmission. Resource sizes of at least two PUSCHs in a second CG resource (i.e., the second configured resource) are different, so the second pre-configured resource may be configured by the network device for an independent transmission.

If the terminal device selects the first pre-configured resource for a repeated PUSCH transmission, a TBS calculated according to each PUSCH resource is the same, so the network device can correctly perform rate matching for PUSCH demodulation on the first pre-configured resource.

If the network device configures the second pre-configured resource for a repeated transmission, the network device and the terminal device may determine a TBS of a transport block transmitted on the second pre-configured resource in at least one of the following methods.

The TBS is determined according to the number of symbols included in PUSCH0, the TBS is determined according to the number of symbols included in PUSCH1, the TBS is determined according to the number of symbols included in PUSCH2, or the TBS is determined according to the average number of symbols included in PUSCH0, PUSCH1, and PUSCH2.

It should be noted that the determination of the TBS is related to the resource configuration and is independent of a resource transmission position of the terminal device. For example, the terminal device also needs to determine a start on the CG resource for CG-PUSCH transmission.

Figure 4:
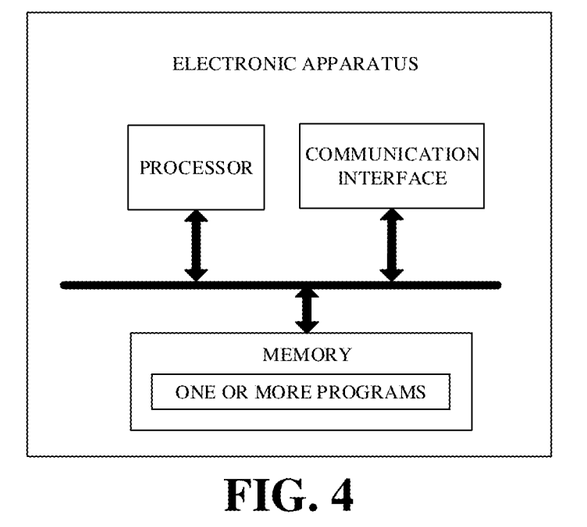
FIG. 4 is a schematic structural diagram of an electronic apparatus provided in implementations of the present disclosure.

Consistent with above implementations, referring to FIG. 4, FIG. 4 is a schematic structural diagram of an electronic apparatus provided in implementations of the present disclosure. As illustrated in FIG. 4, the electronic apparatus includes a memory configured to store one or more programs and a communication interface. The one or more programs include instructions configured to perform the following operations.

A target UL resource on a target carrier for transmitting a target UL channel is determined, and at least part of content in the target UL channel on at least part of the target UL resource according to a detection result of the target carrier is transmitted. Alternatively, a target UL resource on a target carrier for transmitting a target UL channel is determined, and at least part of content in the target UL channel on at least part of the target UL resource is received.

Figure 5:
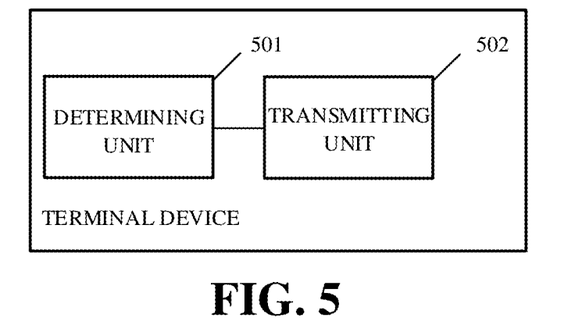
FIG. 5 is a schematic structural diagram of a terminal device provided in implementations of the present disclosure.

Referring to FIG. 5, FIG. 5 is a schematic structural diagram of a terminal device provided in implementations of the present disclosure. As illustrated in FIG. 5, the device includes a determining unit 501 and a transmitting unit 502. The determining unit 501 is configured to determine a target UL resource on a target carrier for transmitting a target UL channel. The transmitting unit 502 is configured to transmit at least part of content in the target UL channel on at least part of the target UL resource according to a detection result of the target carrier.

In a possible implementation, the target UL resource includes a first UL resource and a second UL resource, and the device is further configured to: receive first indication information, where the first indication information indicates whether the first UL resource and the second UL resource are used for a repeated transmission.

In a possible implementation, the first indication information includes at least one of: indication information of whether the target UL resource is used for a repeated transmission, and indication information of a number of repeated transmissions on the target UL resource.

In a possible implementation, the first indication information is transmitted through at least one of: DCI, RRC signaling, and a MAC CE.

In a possible implementation, the target UL resource includes a CG-PUSCH UL resource, and the first indication information is configured in RRC signaling of a parameter of a configured grant configuration, or the first indication information is configured in RRC signaling for activating the configured grant configuration, or the first indication information is contained in an activating DCI for the configured grant configuration.

In a possible implementation, the target UL resource includes a S-PUSCH UL resource, and the first indication information is configured in RRC signaling of a PUSCH configuration parameter or is contained in DCI for scheduling a transmission of the target UL resource.

In a possible implementation, the target UL resource includes a first UL resource and a second UL resource, and the device is further configured to: transmit second indication information to a network device, where the second indication information indicates whether the first UL resource and the second UL resource are used for a repeated transmission.

In a possible implementation, the second indication information includes at least one of: indication information of whether the target UL resource is used for a repeated transmission, indication information of a number of repeated transmissions on the target UL resource, a HARQ process number corresponding to the first UL resource, an NDI corresponding to the first UL resource, an HARQ process number corresponding to the second UL resource, and an NDI corresponding to the second UL resource.

In a possible implementation, the second indication information is transmitted through at least one of: UCI and a DMRS.

In a possible implementation, the target UL resource includes a CG-PUSCH UL resource, and the second indication information is transmitted through UCI or is contained in an UL DMRS, where the UCI indicates to demodulate a CG-PUSCH.

In a possible implementation, the target UL resource includes a S-PUSCH UL resource, and the second indication information is contained in an UL DMRS.

In a possible implementation, the first UL resource and the second UL resource are used for a repeated transmission, and an HARQ process number corresponding to the first UL resource is the same as an HARQ process number corresponding to the second UL resource, or the first UL resource and the second UL resource are used for a repeated transmission, the HARQ process number corresponding to the first UL resource is the same as the HARQ process number corresponding to the second UL resource, and an NDI corresponding to the first UL resource is the same as an NDI corresponding to the second UL resource.

In a possible implementation, the first UL resource and the second UL resource are used for a repeated transmission, and a TBS of a transmission of the first UL resource and the second UL resource is determined based on a number of reference resources.

In a possible implementation, the number of reference resources is determined according to a first one in the target UL resource, the number of reference resources is determined according to a last one in the target UL resource, the number of reference resources is determined according to a UL resource with the least resources in the target UL resource, the number of reference resources is determined according to a UL resource with the most resources in the target UL resource, the number of reference resources is determined according to the first UL resource or the second UL resource, or the number of reference resources is an average number of resources of all UL resources in the target UL resource.

In a possible implementation, the first UL resource and the second UL resource are continuous in time domain, and the second UL resource is later than the first UL resource in time domain.

In a possible implementation, the target UL channel includes a first UL channel and a second UL channel, and the transmitting unit 502 is specifically configured to: transmit by the terminal device the first UL channel on the first UL resource, and transmit the second UL channel on the second UL resource, if detection of the terminal device is successful prior to the first UL resource, or transmit by the terminal device the second UL channel on the second UL resource if the detection of the terminal device fails prior to the first UL resource and is successful prior to the second UL resource.

Figure 6:
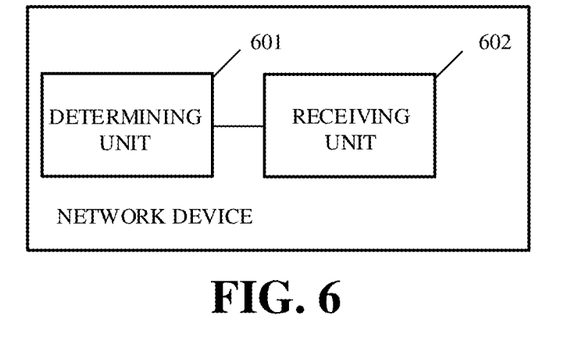
FIG. 6 is a schematic structural diagram of a network device provided in implementations of the present disclosure.

Referring to FIG. 6, FIG. 6 is a schematic structural diagram of a network device provided in implementations of the present disclosure. As illustrated in FIG. 6, the device includes a determining unit 601 and a receiving unit 602. The determining unit 601 is configured to determine a target UL resource on a target carrier for transmitting a target UL channel. The receiving unit 602 is configured to receive at least part of content in the target UL channel on at least part of the target UL resource.

In a possible implementation, the target UL resource includes a first UL resource and a second UL resource, and the device is further configured to: transmit first indication information to a terminal device, where the first indication information indicates whether the first UL resource and the second UL resource are used for a repeated transmission.

In a possible implementation, the first indication information includes at least one of: indication information of whether the target UL resource is used for a repeated transmission, and indication information of a number of repeated transmissions on the target UL resource.

In a possible implementation, the first indication information is transmitted through at least one of: DCI, RRC signaling, and a MAC CE.

In a possible implementation, the target UL resource includes a CG-PUSCH UL resource, and the first indication information is configured in RRC signaling of a parameter of a configured grant configuration, or the first indication information is configured in RRC signaling for activating the configured grant configuration, or the first indication information is contained in an activating DCI for the configured grant configuration.

In a possible implementation, the target UL resource includes a S-PUSCH UL resource, and the first indication information is configured in RRC signaling of a PUSCH configuration parameter or is contained in DCI for scheduling a transmission of the target UL resource.

In a possible implementation, the target UL resource includes a first UL resource and a second UL resource, and the device is further configured to: receive second indication information, where the second indication information indicates whether the first UL resource and the second UL resource are used for a repeated transmission.

In a possible implementation, the second indication information includes at least one of: indication information of whether the target UL resource is used for a repeated transmission, indication information of a number of repeated transmissions on the target UL resource, a HARQ process number corresponding to the first UL resource, an NDI corresponding to the first UL resource, an HARQ process number corresponding to the second UL resource, and an NDI corresponding to the second UL resource.

In a possible implementation, the second indication information is transmitted through at least one of: UCI and a DMRS.

In a possible implementation, the target UL resource includes a CG-PUSCH UL resource, and the second indication information is transmitted through UCI or is contained in an UL DMRS, where the UCI indicates to demodulate a CG-PUSCH.

In a possible implementation, the target UL resource includes a S-PUSCH UL resource, and the second indication information is contained in an UL DMRS.

In a possible implementation, the first UL resource and the second UL resource are used for a repeated transmission, and an HARQ process number corresponding to the first UL resource is the same as an HARQ process number corresponding to the second UL resource, or the first UL resource and the second UL resource are used for a repeated transmission, the HARQ process number corresponding to the first UL resource is the same as the HARQ process number corresponding to the second UL resource, and an NDI corresponding to the first UL resource is the same as an NDI corresponding to the second UL resource.

In a possible implementation, the first UL resource and the second UL resource are used for a repeated transmission, and a TBS of a transmission of the first UL resource and the second UL resource is determined based on a number of reference resources.

In a possible implementation, the number of reference resources is determined according to a first one in the target UL resource, the number of reference resources is determined according to a last one in the target UL resource, the number of reference resources is determined according to a UL resource with the least resources in the target UL resource, the number of reference resources is determined according to a UL resource with the most resources in the target UL resource, the number of reference resources is determined according to the first UL resource or the second UL resource, or the number of reference resources is an average number of resources of all UL resources in the target UL resource.

In a possible implementation, the first UL resource and the second UL resource are continuous in time domain, and the second UL resource is later than the first UL resource in time domain.

In a possible implementation, the target UL channel includes a first UL channel and a second UL channel, and the receiving unit 602 is specifically configured to: receive by the network device the first UL channel on the first UL resource, and receive the second UL channel on the second UL resource, or receive by the network device the second UL channel on the second UL resource.

A computer storage medium is also provided in implementations of the present disclosure. The computer storage medium is configured to store computer programs for electronic data interchange. The computer programs are operable with a computer to perform some or all of the operations of any transmission method described in method implementations.

A computer program product is also provided in implementations of the present disclosure. The computer program product includes a non-transitory computer-readable storage medium configured to store computer programs. The computer programs are operable with a computer to perform some or all of the operations of any transmission method described in method implementations.

It should be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In implementations provided in the present disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), disk or compact disc (CD), and so on.

Implementations of the present disclosure are described in detail above, and specific examples are used herein to illustrate principles and implementations of the present disclosure. The illustration of implementations above are only used to help understand the methods and core ideas of the present disclosure. At the same time, for those of ordinary skill in the art, based on the ideas of the present disclosure, there may be changes in the specific implementations and scope of the present disclosure. In conclusion, the content of this specification should not be construed as a limitation to the present disclosure.

What is claimed is:

1. A transmission method, comprising:
    determining, by a terminal device, a target uplink (UL) resource on a target carrier for transmitting a target UL channel, wherein the target UL resource comprises a first UL resource and a second UL resource;
    receiving, by the terminal device, first indication information, wherein the first indication information indicates whether the first UL resource and the second UL resource are used for a repeated transmission;
    transmitting, by the terminal device, at least part of content in the target UL channel on at least part of the target UL resource according to a detection result of the target carrier;

wherein a transport block size (TBS) of a transmission of the first UL resource and the second UL resource is determined based on a number of reference resources, and the number of reference resources is an average number of resources of all UL resources in the target UL resource.

2. The method of claim 1, wherein the first indication information comprises at least one of:
indication information of whether the target UL resource is used for a repeated transmission; or
indication information of a number of repeated transmissions on the target UL resource.

3. The method of claim 1, wherein the first indication information is transmitted through at least one of: downlink control information (DCI), radio resource control (RRC) signaling, or a media access control-control element (MAC CE).

4. The method of claim 1, wherein the target UL resource comprises a configured grant-physical uplink shared channel (CG-PUSCH) UL resource, and
the first indication information is configured in RRC signaling of a parameter of a configured grant configuration; or
the first indication information is configured in RRC signaling for activating the configured grant configuration; or
the first indication information is contained in an activating DCI for the configured grant configuration.

5. The method of claim 1, wherein the target UL resource comprises a scheduled-physical uplink shared channel (S-PUSCH) UL resource, and the first indication information is configured in RRC signaling of a PUSCH configuration parameter or is contained in DCI for scheduling a transmission of the target UL resource.

6. The method of claim 1, wherein
a hybrid automatic repeat-request (HARQ) process number corresponding to the first UL resource is the same as an HARQ process number corresponding to the second UL resource; or
the HARQ process number corresponding to the first UL resource is the same as the HARQ process number corresponding to the second UL resource, and a new data indicator (NDI) corresponding to the first UL resource is the same as an NDI corresponding to the second UL resource.

7. The method of claim 1, wherein the first UL resource and the second UL resource are continuous in time domain, and the second UL resource is later than the first UL resource in time domain.

8. The method of claim 7, wherein transmitting, by the terminal device, at least part of content in the target UL channel on at least part of the target UL resource according to the detection result of the target carrier comprises:
transmitting, by the terminal device, the first UL channel on the first UL resource, and transmitting, by the terminal device, the second UL channel on the second UL resource, if detection of the terminal device is successful prior to the first UL resource; or
transmitting, by the terminal device, the second UL channel on the second UL resource if the detection of the terminal device fails prior to the first UL resource and is successful prior to the second UL resource.

9. A transmission method, comprising:
determining, by a network device, a target uplink (UL) resource on a target carrier for transmitting a target UL channel, wherein the target UL resource comprises a first UL resource and a second UL resource;
transmitting, by the network device, first indication information to a terminal device, wherein the first indication information indicates whether the first UL resource and the second UL resource are used for a repeated transmission; and
receiving, by the network device, at least part of content in the target UL channel on at least part of the target UL resource;
wherein a transport block size (TBS) of a transmission of the first UL resource and the second UL resource is determined based on a number of reference resources, and the number of reference resources is an average number of resources of all UL resources in the target UL resource.

10. The method of claim 9, wherein the first indication information comprises at least one of:
indication information of whether the target UL resource is used for a repeated transmission; or
indication information of a number of repeated transmissions on the target UL resource.

11. The method of claim 9, wherein the first indication information is transmitted through at least one of: downlink control information (DCI), radio resource control (RRC) signaling, or a media access control-control element (MAC CE).

12. The method of claim 9, wherein the target UL resource comprises a configured grant-physical uplink shared channel (CG-PUSCH) UL resource, and
the first indication information is configured in RRC signaling of a parameter of a configured grant configuration; or
the first indication information is configured in RRC signaling for activating the configured grant configuration; or
the first indication information is contained in an activating DCI for the configured grant configuration.

13. The method of claim 9, wherein the target UL resource comprises a scheduled-physical uplink shared channel (S-PUSCH) UL resource, and the first indication information is configured in RRC signaling of a PUSCH configuration parameter or is contained in DCI for scheduling a transmission of the target UL resource.

14. The method of claim 9, wherein
a hybrid automatic repeat-request (HARQ) process number corresponding to the first UL resource is the same as an HARQ process number corresponding to the second UL resource; or
the HARQ process number corresponding to the first UL resource is the same as the HARQ process number corresponding to the second UL resource, and a new data indicator (NDI) corresponding to the first UL resource is the same as an NDI corresponding to the second UL resource.

15. A terminal device, comprising:
a transceiver;
a memory configured to store one or more programs; and
a processor configured to invoke and execute the one or more programs stored in the memory to:
determine a target uplink (UL) resource on a target carrier for transmitting a target UL channel, wherein the target UL resource comprises a first UL resource and a second UL resource;
receive first indication information, wherein the first indication information indicates whether the first UL resource and the second UL resource are used for a repeated transmission; and cause the transceiver to transmit at least part of content in the target UL channel on at least part of the target UL resource according to a detection result of the target carrier;

wherein a transport block size (TBS) of a transmission of the first UL resource and the second UL resource is determined based on a number of reference resources, and the number of reference resources is an average number of resources of all UL resources in the target UL resource.

16. The terminal device of claim 15, wherein the first indication information comprises at least one of:

indication information of whether the target UL resource is used for a repeated transmission; or indication information of a number of repeated transmissions on the target UL resource.

17. The terminal device of claim 15, wherein the first indication information is transmitted through at least one of: downlink control information (DCI), radio resource control (RRC) signaling, or a media access control-control element (MAC CE).

18. The terminal device of claim 15, wherein the target UL resource comprises a configured grant-physical uplink shared channel (CG-PUSCH) UL resource, and the first indication information is configured in RRC signaling of a parameter of a configured grant configuration; or the first indication information is configured in RRC signaling for activating the configured grant configuration; or the first indication information is contained in an activating DCI for the configured grant configuration.

19. The terminal device of claim 15, wherein the target UL resource comprises a scheduled-physical uplink shared channel (S-PUSCH) UL resource, and the first indication information is configured in RRC signaling of a PUSCH configuration parameter or is contained in DCI for scheduling a transmission of the target UL resource.

20. The terminal device of claim 15, wherein a hybrid automatic repeat-request (HARQ) process number corresponding to the first UL resource is the same as an HARQ process number corresponding to the second UL resource; or the HARQ process number corresponding to the first UL resource is the same as the HARQ process number corresponding to the second UL resource, and a new data indicator (NDI) corresponding to the first UL resource is the same as an NDI corresponding to the second UL resource.

* * * * *